US012621022B2

(12) United States Patent
Lim et al.

(10) Patent No.:  US 12,621,022 B2
(45) Date of Patent:        May 5, 2026

(54) METHOD FOR TRANSMITTING SIGNAL USING PORT VIRTUALIZATION MATRIX, AND ELECTRONIC DEVICE PERFORMING METHOD

(71) Applicants:Samsung Electronics Co., Ltd., Suwon-si (KR); UIF (University Industry Foundation), Yonsei University, Seoul (KR)

(72) Inventors: Chaehee Lim, Suwon-si (KR); Soo Yong Choi, Seongnam-si (KR); Dong Heon Lee, Seoul (KR); Seong Yeop Joung, Seoul (KR)

(73) Assignees: Samsung Electronics Co., Ltd., Suwon-si (KR); UIF (University Industry Foundation), Yonsei University, Seoul (KR)

( * ) Notice:     Subject to any disclaimer, the term of this patent is extended or adjusted under 35 U.S.C. 154(b) by 64 days.

(21) Appl. No.: 18/597,227

(22) Filed:     Mar. 6, 2024

(65)             Prior Publication Data

US 2024/0250721 A1     Jul. 25, 2024

Related U.S. Application Data

(63) Continuation     of     application     No. PCT/KR2022/011183, filed on Jul. 29, 2022.

(30)        Foreign Application Priority Data

Sep. 6, 2021     (KR) ........................ 10-2021-0118603

(51) Int. Cl.
H04B 7/0417          (2017.01)
H04B 7/0452          (2017.01)
        (Continued)

(52) U.S. Cl.
CPC ......... H04B 7/0417 (2013.01); H04B 7/0452 (2013.01); H04B 7/0486 (2013.01); H04B 7/0626 (2013.01); H04B 7/063 (2013.01)

(58) Field of Classification Search
CPC ................................................... H04B 7/0417
(Continued)

(56)             References Cited

U.S. PATENT DOCUMENTS 8,331,310 B2     12/2012  Wang et al.
9,148,208 B2      9/2015  Zhu et al.
(Continued)

FOREIGN PATENT DOCUMENTS

WO        2020/117106 A1     6/2020

OTHER PUBLICATIONS

International Search Report dated Oct. 26, 2022, issued in International Application No. PCT/KR2022/011183.
(Continued)

*Primary Examiner* — Lihong Yu
(74) *Attorney, Agent, or Firm* — Jefferson IP Law, LLP

(57)             ABSTRACT

A base station is provided. The base station includes a transceiver configured to exchange data with an external device, memory storing one or more computer programs, and one or more processors communicatively coupled to the transceiver and the memory, wherein the one or more computer programs include computer-executable instructions that, when executed by the one or more processors, cause the base station to generate a channel state indicator-reference signal (CSI-RS) to be transmitted to a user terminal through a plurality of antennas of the base station, transmit a test signal generated by applying an initial port virtualization matrix to the CSI-RS to the user terminal through a transceiver, receive, from the user terminal, rank information for channels to which the initial port virtualiza- (Continued)

tion matrix is applied and information about a target precoding matrix for the channels, obtain partial channel information on the basis of an sounding reference signal (SRS) received from the user terminal, and generate a target port virtualization matrix on the basis of the rank information, the target precoding matrix, and the partial channel information.

16 Claims, 8 Drawing Sheets

(51) Int. Cl.
*H04B 7/0456* (2017.01)
*H04B 7/06* (2006.01)

(58) Field of Classification Search
USPC ........................................................ 375/224
See application file for complete search history.

(56) References Cited

U.S. PATENT DOCUMENTS

| | | | |
|---|---|---|---|
| 10,116,371 B2 | 10/2018 | Park et al. | |
| 10,250,302 B2 | 4/2019 | Kim et al. | |
| 10,771,141 B2 | 9/2020 | Yum et al. | |
| 10,848,223 B2 | 11/2020 | Kim et al. | |
| 11,336,487 B1 * | 5/2022 | Dakshinkar | H04L 5/0048 |
| 2010/0067480 A1 | 3/2010 | Wang et al. | |
| 2012/0069926 A1 * | 3/2012 | Park | H04B 7/0486 |
| | | | 375/267 |
| 2015/0215014 A1 | 7/2015 | Zhu et al. | |
| 2016/0211902 A1 | 7/2016 | Park et al. | |
| 2017/0279502 A1 | 9/2017 | Kim et al. | |
| 2017/0373743 A1 * | 12/2017 | Park | H04L 5/0048 |
| 2018/0241454 A1 | 8/2018 | Lee et al. | |
| 2018/0262250 A1 * | 9/2018 | Kim | H04B 7/063 |
| 2018/0294847 A1 | 10/2018 | Lee et al. | |
| 2019/0140723 A1 | 5/2019 | Yum et al. | |
| 2020/0154410 A1 | 5/2020 | Suzuki et al. | |
| 2020/0229013 A1 * | 7/2020 | Kim | H04B 7/0478 |
| 2021/0027478 A1 * | 1/2021 | Chen | G06T 7/33 |
| 2021/0036749 A1 | 2/2021 | Qiang et al. | |

OTHER PUBLICATIONS

Korean Office Action dated Jan. 2, 2026, issued in Korean Patent Application No. 10-2021-0118603.

* cited by examiner

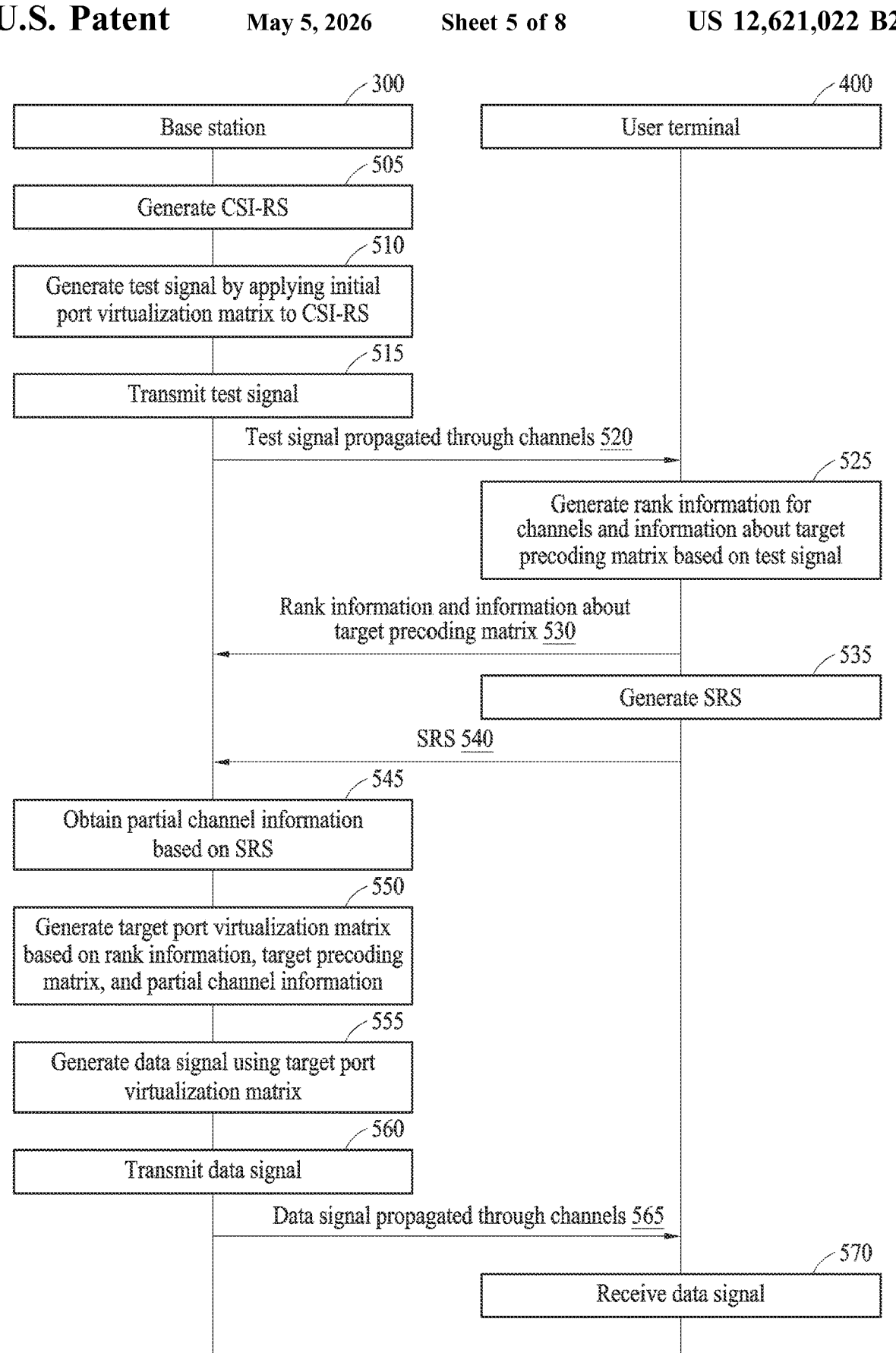

300

Base station

505

Generate CSI-RS

510

Generate test signal by applying initial port virtualization matrix to CSI-RS

515

Transmit test signal

Test signal propagated through channels 520

400

User terminal

525

Generate rank information for channels and information about target precoding matrix based on test signal Rank information and information about target precoding matrix 530

535

Generate SRS

SRS 540

545

Obtain partial channel information based on SRS

550

Generate target port virtualization matrix based on rank information, target precoding matrix, and partial channel information

555

Generate data signal using target port virtualization matrix

560

Transmit data signal

Data signal propagated through channels 565

570

Receive data signal

FIG. 5

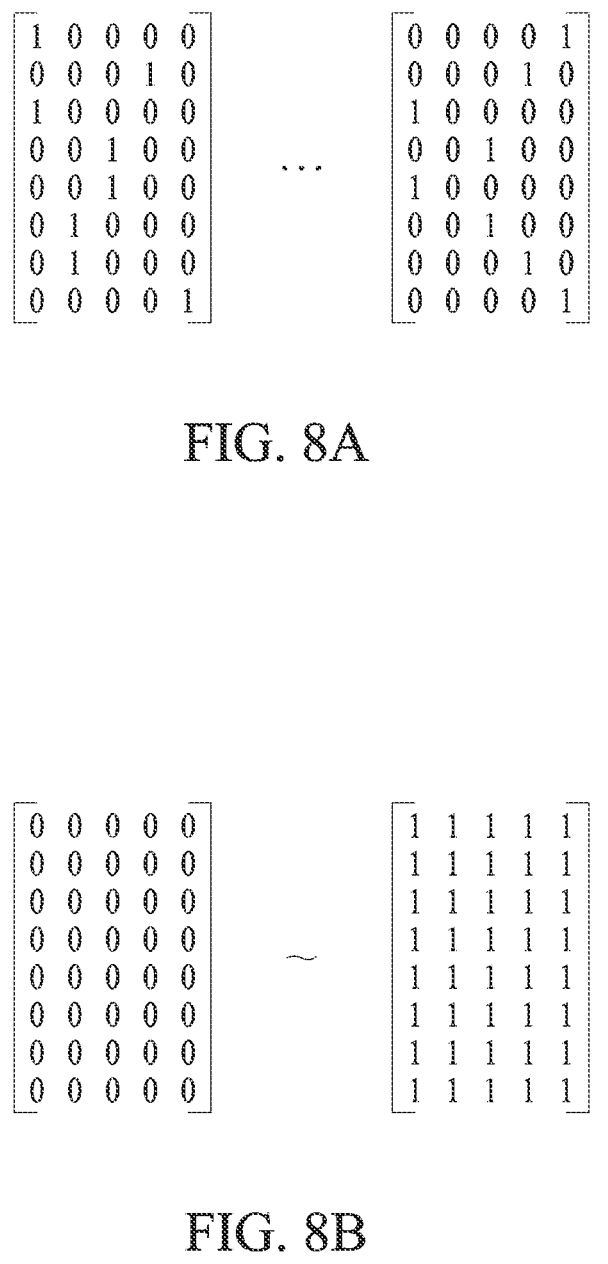

$$
\begin{bmatrix}
1 & 0 & 0 & 0 & 0 \\
0 & 0 & 0 & 1 & 0 \\
1 & 0 & 0 & 0 & 0 \\
0 & 0 & 1 & 0 & 0 \\
0 & 0 & 1 & 0 & 0 \\
0 & 1 & 0 & 0 & 0 \\
0 & 1 & 0 & 0 & 0 \\
0 & 0 & 0 & 0 & 1
\end{bmatrix}
\cdots
\begin{bmatrix}
0 & 0 & 0 & 0 & 1 \\
0 & 0 & 0 & 1 & 0 \\
1 & 0 & 0 & 0 & 0 \\
0 & 0 & 1 & 0 & 0 \\
1 & 0 & 0 & 0 & 0 \\
0 & 0 & 1 & 0 & 0 \\
0 & 0 & 0 & 1 & 0 \\
0 & 0 & 0 & 0 & 1
\end{bmatrix}
$$

FIG. 8A $$
\begin{bmatrix}
0 & 0 & 0 & 0 & 0 \\
0 & 0 & 0 & 0 & 0 \\
0 & 0 & 0 & 0 & 0 \\
0 & 0 & 0 & 0 & 0 \\
0 & 0 & 0 & 0 & 0 \\
0 & 0 & 0 & 0 & 0 \\
0 & 0 & 0 & 0 & 0 \\
0 & 0 & 0 & 0 & 0
\end{bmatrix}
\sim
\begin{bmatrix}
1 & 1 & 1 & 1 & 1 \\
1 & 1 & 1 & 1 & 1 \\
1 & 1 & 1 & 1 & 1 \\
1 & 1 & 1 & 1 & 1 \\
1 & 1 & 1 & 1 & 1 \\
1 & 1 & 1 & 1 & 1 \\
1 & 1 & 1 & 1 & 1 \\
1 & 1 & 1 & 1 & 1
\end{bmatrix}
$$

FIG. 8B

METHOD FOR TRANSMITTING SIGNAL USING PORT VIRTUALIZATION MATRIX, AND ELECTRONIC DEVICE PERFORMING METHOD

CROSS-REFERENCE TO RELATED APPLICATION(S)

This application is a continuation application, claiming priority under § 365(c), of an International application No. PCT/KR2022/011183, filed on Jul. 29, 2022, which is based on and claims the benefit of a Korean patent application number 10-2021-0118603, filed on Sep. 6, 2021, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) SAMSUNG ELECTRONICS CO., LTD. and 2) UIF (University Industry Foundation), Yonsei University.

BACKGROUND

1. Field

The disclosure relates to signal transmission technology for wireless communication. More particularly, the disclosure relates to signal transmission technology using a port virtualization matrix.

2. Description of Related Art

A multi user-multi input multi output (MU-MIMO) system may increase spectral efficiency by transmitting signals to multiple users within the same time-frequency resources through spatial multiplexing. The spatial multiplexing method performs preprocessing that reflects the channel states on data to be transmitted. Data is transferred to a channel state indicator-reference signal (CSI-RS) port through a port precoder, the transferred data is transferred to an antenna element through a port virtualization matrix, and the antenna element transmits the data. The port precoder is designed by receiving feedback on a value suitable for an effective channel measured by a user terminal from the user terminal. Since information about a port virtualization matrix is included in the effective channel measured by the user terminal, an appropriate port virtualization matrix needs to be designed to improve data transmission performance.

The above information is presented as background information only to assist with an understanding of the disclosure. No determination has been made, and no assertion is made, as to whether any of the above might be applicable as prior art with regard to the disclosure.

SUMMARY

A base station's transmitting a channel state indicator-reference signal (CSI-RS) multiple times to design an optimal port virtualization matrix consumes resources, and thus, it is difficult for a base station having insufficient channel information to design an optimal port virtualization matrix.

Aspects of the disclosure are to address at least the above-mentioned problems and/or disadvantages and to provide at least the advantages described below. Accordingly, an aspect of the disclosure is to provide a method of transmitting a CSI-RS a small number of times and generating a port virtualization matrix based on the same.

Additional aspects will be set forth in part in the description which follows and, in part, will be apparent from the description, or may be learned by practice of the presented embodiments.

In accordance with an aspect of the disclosure, a base station is provided. The base station includes a transceiver configured to exchange data with an external device, memory storing one or more computer programs and one or more processors communicatively coupled to the transceiver and the memory, wherein the one or more computer programs include computer-executable instructions that, when executed by the one or more processors, cause the base station to generate a channel state information-reference signal (CSI-RS) to be transmitted to a user terminal through a plurality of antennas of the c transceiver, transmit a test signal generated by applying an initial port virtualization matrix to the CSI-RS to the user terminal through the transceiver, wherein the test signal is propagated to the user terminal through channels between the plurality of antennas of the transceiver and one or more antennas of the user terminal, receive, from the user terminal through the transceiver, rank information for the channels to which the initial port virtualization matrix is applied and information about a target precoding matrix for the channels, obtain partial channel information based on a sounding reference signal (SRS) received from the user terminal through the transceiver, and generate a target port virtualization matrix based on the rank information, the target precoding matrix, and the partial channel information, wherein the target port virtualization matrix may be used by the base station to transmit data to the user terminal.

In accordance with another aspect of the disclosure, a signal transmission method for wireless communication, performed by a base station is provided. The signal transmission method includes generating, by the base station, a CSI-RS to be transmitted to a user terminal through a plurality of antennas of transceiver of a base station, transmitting, by the base station, a test signal generated by applying an initial port virtualization matrix to the CSI-RS to the user terminal, wherein the test signal is propagated to the user terminal through channels between the plurality of antennas of the transceiver and one or more antennas of the user terminal, receiving, by the base station from the user terminal, rank information for the channels to which the initial port virtualization matrix is applied and information about a target precoding matrix for the channels, obtaining, by the base station, partial channel information based on an SRS received from the user terminal, generating, by the base station, a target port virtualization matrix based on the rank information, the target precoding matrix, and the partial channel information, and transmitting, by the base station, a data signal to the user terminal using the target port virtualization matrix.

In accordance with another aspect of the disclosure, a port virtualization matrix determination method, performed by a base station is provided. The port virtualization matrix determination method includes generating, by the base station, a set of arbitrary basic matrices having a preset size, generating, by the base station, a port virtualization codebook by selecting a portion of the basic matrices, transmitting, by the base station, a test signal generated by applying an initial port virtualization matrix to a CSI-RS to a user terminal, wherein the test signal is propagated to the user terminal through channels between a plurality of antennas of the base station and one or more antennas of the user terminal, receiving, by the base station from the user terminal, rank information for the channels to which the initial port virtualization matrix is applied and information about a target precoding matrix for the channels, obtaining, by the base station, partial channel information based on an SRS received from the user terminal, and determining, by the base station, a target port virtualization matrix in the port virtualization codebook based on the rank information, the target precoding matrix, and the partial channel information, wherein the target port virtualization matrix may be used by the base station to transmit data to the user terminal.

In accordance with another aspect of the disclosure, One or more non-transitory computer-readable storage media storing one or more computer programs including computer-executable instructions that, when executed by one or more processors of a base station, cause the base station to perform operations are provided. The operations include generating, by the base station, a channel state information-reference signal (CSI-RS) to be transmitted to a user terminal through a plurality of antennas of a transceiver of a base station, transmitting, by the base station, a test signal generated by applying an initial port virtualization matrix to the CSI-RS to the user terminal, wherein the test signal is propagated to the user terminal through channels between the plurality of antennas of the transceiver and one or more antennas of the user terminal, receiving, by the base station from the user terminal, rank information for the channels to which the initial port virtualization matrix is applied and information about a target precoding matrix for the channels, obtaining, by the base station, partial channel information based on a sounding reference signal (SRS) received from the user terminal, generating, by the base station, a target port virtualization matrix based on the rank information, the target precoding matrix, and the partial channel information, and transmitting, by the base station, a data signal to the user terminal using the target port virtualization matrix In accordance with another aspect of the disclosure, a method of transmitting wireless signals to a user terminal using a port virtualization matrix is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a signal flowchart of a method of transmitting and receiving data signals based on a port virtualization matrix according to an embodiment of the disclosure;

FIGS. 8A and 8B illustrate a set of arbitrary basic matrices according to various embodiments of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
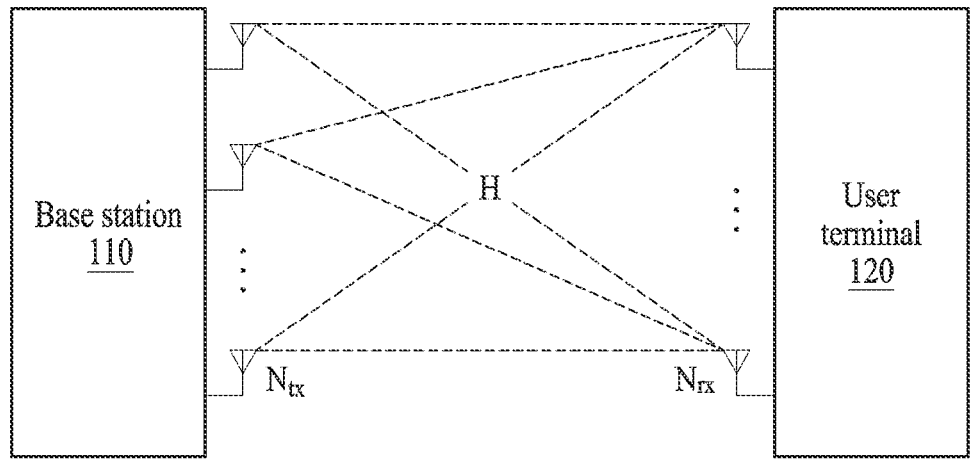
FIG. 1 is a configuration diagram of a multiple-input and multiple-output (MIMO)) antenna communication system according to an embodiment of the disclosure.

FIG. 1 is a configuration diagram of a multiple-input and multiple-output (MIMO) antenna communication system according to an embodiment of the disclosure.

FIG. 1 illustrates a base station and a user terminal, as some of nodes that use a wireless channel in a wireless communication system. Although FIG. 1 shows only one base station, the wireless communication system may further include other base stations that are the same as or similar to a base station 110.

Referring to FIG. 1, the base station 110 may be a network infrastructure that provides wireless access to a plurality of user terminals, including a user terminal 120. The base station 110 may have coverage defined as a predetermined geographic area based on the range that allows signal transmission. In addition to the base station, the base station 110 may be referred to as "access point (AP)", "eNodeB (eNB)", "5th generation node (5G node)", "next generation nodeB (gNB)", "wireless point", "transmission/reception point (TRP)", or any other term having a technically equivalent meaning.

The user terminal 120 is a device used by a user and communicates with the base station 110 through a wireless channel. For example, the user terminal 120 is operated without the user being involved. That is, the user terminal 120 may be a device for performing machine type communication (MTC), and may not be carried by the user. The user terminal 120 may be referred to as "user equipment (UE)", "mobile station", "subscriber station", "remote terminal", "wireless terminal", "user device", or any other term having a technically equivalent meaning. For example, the user terminal 120 is shown as including Nr antennas, but the number of antennas included in the user terminal 120 is not limited thereto.

According to an embodiment, the base station 110 may simultaneously transmit signals for providing downlink (DL) to a plurality of user terminals, including the user terminal 120, using $N_{tx}$ antennas. The user terminal 120 may receive signals propagated by the base station 110 using the $N_{rx}$ antennas. Channels may be generated between the $N_{tx}$ antennas and the $N_{rx}$ antennas, and channel information (H) may be defined for the channels. The channel information may be a channel matrix.

Figure 2:
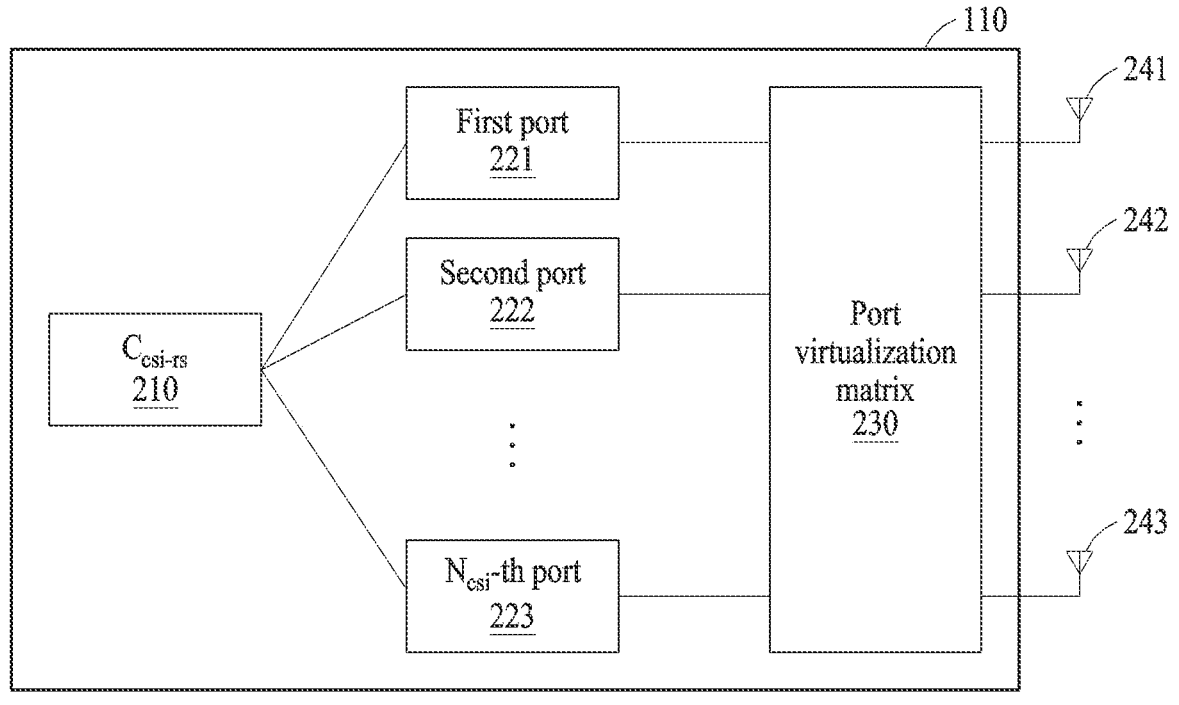
FIG. 2 is a block diagram of a base station for transmitting a channel state indicator-reference signal (CSI-RS) according to an embodiment of the disclosure.

FIG. 2 is a block diagram of a base station for transmitting a channel state indicator-reference signal (CSI-RS) according to an embodiment of the disclosure.

Referring to FIG. 2, when the number of antenna elements and the number of CSI-RS ports are the same, an identity matrix representing a 1:1 mapping method between the antenna elements and the CSI-RS ports may be used. The method using an identity matrix may limit the gain to be obtained by using an optimized port virtualization matrix.

According to another example, when the number of CSI-RS ports is less than the number of antenna elements, an initially set port virtualization matrix may be used. Since the method using an initially set matrix may not reflect changes in the channel environment during actual data transmission, data transmission performance may decrease.

The port virtualization matrices used in the two methods are designed regardless of the channel environment between antennas during actual data transmission.

According to an embodiment, a port virtualization matrix 230 defining a mapping relationship between CSI-RS ports 221, 222, and 223 and antenna elements 241, 242, and 243 may be considered based on a channel environment during actual data transmission. For example, $C_{csi-rs}$ 210, as a CSI-RS transmitted and received between the base station 110 and a user terminal (e.g., the user terminal 120 of FIG.

2), may be modulated to a radio frequency (RF) signal through a precoding matrix (not shown) and the port virtualization matrix 230, and the modulated RF signal may be transmitted to the user terminal through the antenna elements 241, 242, and 243.

The user terminal may estimate a precoding matrix suitable for the channel environment between antennas based on the received RF signal, and transmit information about the estimated precoding matrix (e.g., a precoding matrix indicator (PMI)) to the base station 110.

Additionally, the user terminal may propagate a sounding reference signal (SRS) to estimate an uplink (UL) channel state of the base station 110 to the base station 110. The base station 110 may estimate a partial channel state between the antennas of the base station 110 and a predetermined antenna of the user terminal through the SRS.

The base station 110 may update the port virtualization matrix 230 based on the estimated precoding matrix and the partial channel state. Hereinafter, a method of updating (or generating) the port virtualization matrix 230 is described in detail with reference to FIGS. 3 to 7, 8A, and 8B.

Figure 3:
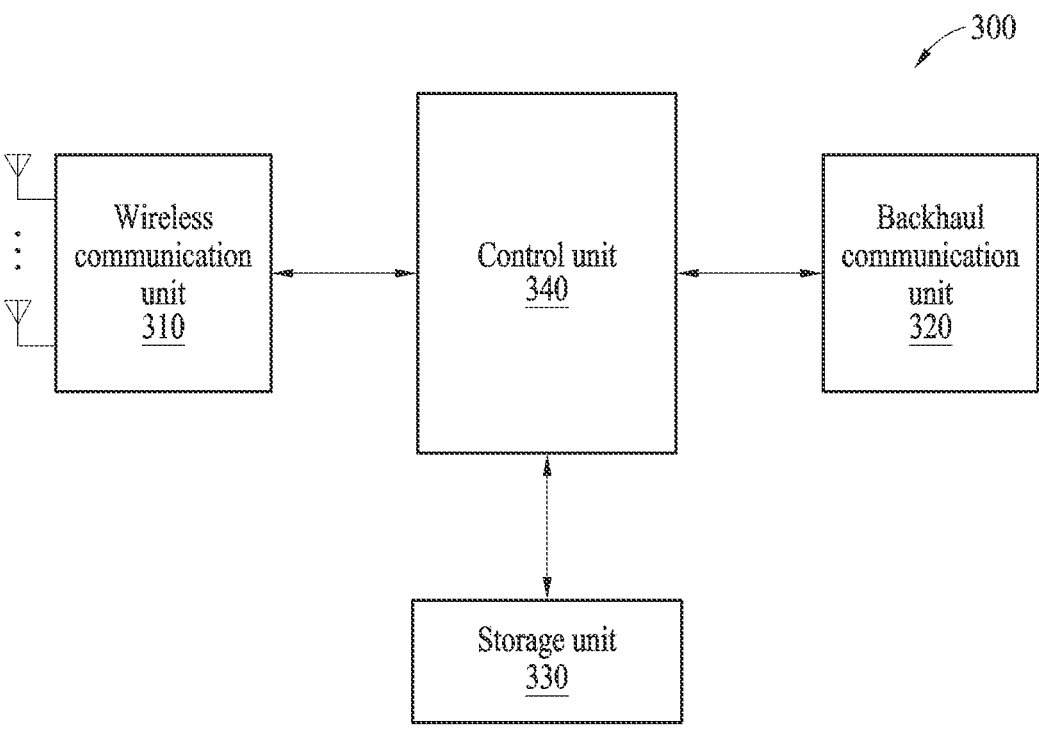
FIG. 3 illustrates a configuration of a base station in a wireless communication system according to an embodiment of the disclosure.

FIG. 3 illustrates a configuration of a base station in a wireless communication system according to an embodiment of the disclosure.

Referring to FIG. 3, the configuration of a base station 300 may be construed as the configuration of the base station 110 described above with reference to FIG. 1. The terms such as "-unit," "-er(or)," etc., as used hereinafter may refer to a part for processing at least one function or operation and may be implemented as hardware, software, or a combination of hardware and software.

According to an embodiment, the base station 300 may include a wireless communication unit 310, a backhaul communication unit 320, a storage unit 330, and a control unit 340. The base station 300 may be a wireless communication device for communicating with a terminal.

The wireless communication unit 310 may perform functions for transmitting and receiving signals through a wireless channel. For example, the wireless communication unit 310 performs a conversion function between a baseband signal and a bit string according to the physical layer standard of the system. For example, in data transmission, the wireless communication unit 310 may generate complex symbols by encoding and modulating a transmission bit string. Additionally, in data reception, the wireless communication unit 310 may restore the received bit string by demodulating and decoding the baseband signal.

The wireless communication unit 310 may up-convert the baseband signal into an RF band signal and transmit the RF band signal through an antenna, and down-convert the RF band signal received through the antenna into a baseband signal. To this end, the wireless communication unit 310 may include a transmission filter, a reception filter, an amplifier, a mixer, an oscillator, a digital-to-analog convertor (DAC), an analog-to-digital convertor (ADC), and the like. The wireless communication unit 310 may include multiple transmission and reception paths.

The wireless communication unit 310 may include a communication module (or package-type module) including at least one antenna array including multiple antenna elements. For example, the communication module may further include a field-programmable gate array (FPGA). The FPGA may be a semiconductor device that includes a programmable logic device and a programmable internal line. The programmable logic device may be programmed by duplicating logic gates such as AND, OR, XOR, and NOR and more complex decoder functions. The FPGA may further include a flip-flop or memory.

According to an embodiment, the wireless communication unit 310 may include a digital unit and an analog unit in terms of hardware, and the analog unit may include multiple sub-units according to the operating power, operating frequency, etc. The digital unit may be implemented as at least one processor (e.g., digital signal processor (DSP)).

The wireless communication unit 310 may transmit and receive signals as described above. Accordingly, all or part of the wireless communication unit 310 may be referred to as a "transmitter", "receiver", or "transceiver". Additionally, in the following description, transmission and reception performed through a wireless channel are used in a sense including the processing performed by the wireless communication unit 310 as described above.

The backhaul communication unit 320 provides an interface for communicating with other nodes in the network. For example, the backhaul communication unit 320 may convert a bit string to be transmitted from the base station 110 to another node (e.g., another access node, another base station, an upper node, a core network, etc.) into a physical signal, and convert a physical signal received from another node into a bit string.

The storage unit 330 may store data such as a basic program for operation of the base station 110, an application program, and setting information. The storage unit 330 may include volatile memory, non-volatile memory, or a combination of volatile memory and non-volatile memory. The storage unit 330 may provide the stored data in response to a request from the control unit 340.

The control unit 340 may control the overall operations of the base station 300. For example, the control unit 340 may transmit and receive signals through the wireless communication unit 310 or the backhaul communication unit 320. The control unit 340 may record and read data in and from the storage unit 330. The control unit 340 may perform functions of a protocol stack required by communication standards. According to another implementation example, the protocol stack may be included in the wireless communication unit 310. For example, the control unit 340 may include at least one processor as a hardware component for performing the functions described above.

Figure 4:
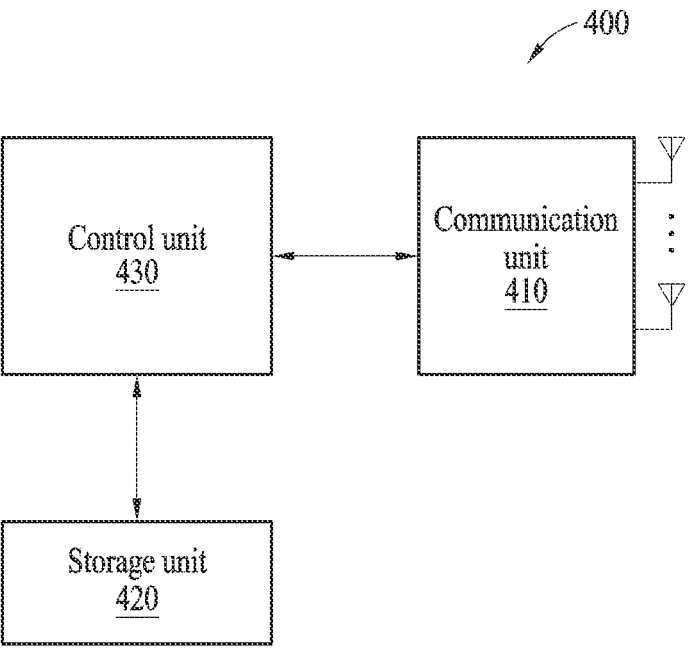
FIG. 4 illustrates a configuration of a user terminal in a wireless communication system according to an embodiment of the disclosure.

FIG. 4 illustrates a configuration of a terminal in a wireless communication system according to an embodiment of the disclosure.

Referring to FIG. 4, the configuration may be construed as the configuration of the user terminal 120 described above with reference to FIG. 1. According to an embodiment, the user terminal 120 may include a communication unit 410, a storage unit 420, and a control unit 430.

The communication unit 410 may perform functions for transmitting and receiving signals through a wireless channel. For example, the communication unit 410 performs a conversion function between a baseband signal and a bit string according to the physical layer standard of the system. For example, in data transmission, the communication unit 410 generates complex symbols by encoding and modulating a transmission bit string. In data reception, the communication unit 410 may restore the received bit string by demodulating and decoding the baseband signal.

The communication unit 410 may up-convert the baseband signal into an RF band signal and transmit the RF band signal through an antenna, and down-convert the RF band signal received through the antenna into a baseband signal. For example, the communication unit 410 includes a transmission filter, a reception filter, an amplifier, a mixer, an oscillator, a DAC, an ADC, and the like.

The communication unit 410 may include multiple transmission and reception paths. The communication unit 410 includes at least one antenna array including multiple antenna elements. For example, an antenna element is referred to as an antenna, and an antenna array including multiple antenna elements may be construed as including multiple antennas.

The communication unit 410 may include a digital circuit and an analog circuit (e.g., radio frequency integrated circuit (RFIC)), in terms of hardware. For example, the digital circuit and the analog circuit are implemented as one package. The communication unit 410 may include multiple RF chains. The communication unit 410 may perform beamforming.

The communication unit 410 may transmit and receive signals as described above. Accordingly, all or part of the communication unit 410 may be referred to as a "transmitter", "receiver", or "transceiver". Additionally, in the following description, transmission and reception performed through a wireless channel are used in a sense including the processing performed by the communication unit 410 as described above.

The storage unit 420 may store data such as a basic program for operation of the user terminal 400, an application program, and setting information. The storage unit 420 may include volatile memory, non-volatile memory, or a combination of volatile memory and non-volatile memory. The storage unit 420 provides the stored data in response to a request from the control unit 430.

The control unit 430 may control the overall operations of the user terminal 400. For example, the control unit 430 transmits and receive signals through the communication unit 410. The control unit 430 may record and read data in and from the storage unit 420. The control unit 430 may perform functions of a protocol stack required by communication standards. The control unit 430 may include at least one processor or microprocessor for performing the functions described above, or may be implemented as part of a processor. For example, part of the communication unit 410 and the control unit 430 are referred to as a communication processor (CP).

FIG. 5 is a signal flowchart of a method of transmitting and receiving data signals based on a port virtualization matrix according to an embodiment of the disclosure.

Referring to FIG. 5, the following operations (e.g., operations 505 to 570) may be performed by a control unit (e.g., the control unit 340 of FIG. 3) of a base station (e.g., the base station 110 of FIG. 1 or the base station 300 of FIG. 3).

In operation 505, the base station 300 may generate a CSI-RS (channel state information-reference signal) to be transmitted to a user terminal (e.g., the user terminal 120 of FIG. 1 or the user terminal 400 of FIG. 4) through a plurality of antennas (e.g., the antenna elements 241, 242, and 243 of FIG. 2) of a communication module (e.g., the wireless communication unit 310) of the base station 300. For example, the size of the CSI-RS is $[N_{csi} \times N_{csi}]$.

In operation 510, the base station 300 may generate a test signal by applying an initial port virtualization matrix $$V_{csi}^0$$

to the CSI-RS. For example, the number of one or more antenna ports is $N_{csi}$. Each of the one or more antenna ports may be a physical antenna port or a virtual antenna port. For example, the size of the initial port virtualization matrix $$V_{csi}^0$$

is $[N_{tx} \times N_{csi}]$.

In operation 515, the base station 300 may transmit the test signal through the plurality of antennas of the communication module. For example, the number of a plurality of antennas is $N_{tx}$.

In operation 520, the test signal may be propagated through channels between the plurality of antennas of the base station 300 and one or more antennas of the user terminal 400. For example, the channel matrix H representing the channels is $[N_{rx} \times N_{tx}]$.

The user terminal 400 may receive the test signal using the one or more antennas. For example, the number of one or more antennas is $N_{rx}$.

In operation 525, the user terminal 400 may generate rank information for channels and information about a target precoding matrix based on the received test signal. The user terminal 400 may estimate channels based on the received test signal. The user terminal 400 may determine a precoding matrix most appropriate for the estimated channels. For example, the user terminal 400 determines one of a plurality of precoding matrices in a pre-generated precoding codebook to be the target precoding matrix, using Equation 1 below.

$$PMI = \underset{i=1,\ldots,M}{\mathrm{argmax}} \sum_{j=1,\ldots,r} \log\left(1 + \frac{|R_j^H HV_{csi}W_{i,j}|^2}{\sum_{k \neq j}|R_j^H HV_{csi}W_{i,k}| + \sigma^2}\right) \quad \text{Equation 1}$$

In Equation 1, PMI may be the information about the target precoding matrix, M may be the number of a plurality of precoding matrices in a precoding codebook, the matrix W may be one of the plurality of precoding matrices, the matrix $HV_{csi}$ may denote a port virtualization matrix $V_{csi}$ to which the matrix H representing the estimated channels is applied, the matrix R may denote a receiver matrix of the user terminal 400, and $\sigma$ may be a preset value. For example, the size of the matrix R is $[r \times N_{rx}]$. r may be the rank of the channel matrix H.

In operation 530, the user terminal 400 may transmit the rank information for the channels and the information about the target precoding matrix for the channels (e.g., PMI) to the base station 300. For example, the size of the target precoding matrix is $[N_{csi} \times r]$.

In operation 535, the user terminal 400 may generate an SRS for estimating a channel state of uplink (UL) of the base station 300.

In operation 540, the user terminal 400 may propagate the SRS using any one target antenna among the one or more antennas. The base station 300 may receive the SRS through the plurality of antennas.

In operation 545, the base station 300 may obtain partial channel information based on the SRS. The partial channel information may not be channel information for all of the one or more antennas of the user terminal 400 and the plurality of antennas of the base station 300, but may be channel information for the target antenna of the user terminal 400 and some of the plurality of antennas of the base station 300.

In operation 550, the base station 300 may generate a target port virtualization matrix $$V_{csi}^1$$

based on the rank information, the target precoding matrix, and the partial channel information. For example, the size of the generated target port virtualization matrix is $[N_{csi} \times r]$. The target port virtualization matrix may be generated (or determined) to have a higher data transmission rate than the data transmission rate when the previous initial port virtualization matrix is used.

According to an embodiment, the base station 300 may generate the target port virtualization matrix by inputting the rank information, the target precoding matrix, and the partial channel information into a pre-trained port virtualization matrix generation model. The port virtualization matrix generation model is described in detail below with reference to FIG. 6.

According to an embodiment, the base station 300 may input the rank information, the target precoding matrix, and the partial channel information to the pre-trained port virtualization matrix generation model, and obtain the target port virtualization matrix among a plurality of candidate port virtualization matrices in a pre-generated port virtualization codebook as a result of the inputting. The method of pre-generating the port virtualization codebook is described in detail below with reference to FIGS. 7, 8A, and 8B.

For example, elements of the target port virtualization matrix are "0" or "1". As another example, the elements of the target port virtualization matrix may be a combination of exponential functions.

In operation 555, the base station 300 may generate a data signal using the target port virtualization matrix. For example, the base station 300 generates data s to be transmitted into r data streams corresponding to ranks. The base station 300 may generate the data signal through the target precoding matrix and the target port virtualization matrix on the generated data streams.

In operation 560, the base station 300 may modulate the data signal into an RF signal and transmit the modulated data signal to the user terminal 400 through the plurality of antennas.

In operation 565, the data signal may be propagated through channels between the plurality of antennas of the base station 300 and one or more antennas of the user terminal 400.

In operation 570, the user terminal 400 may receive the data signal using the one or more antennas. The user terminal 400 may obtain the data s by processing the received data signal.

Figure 6:
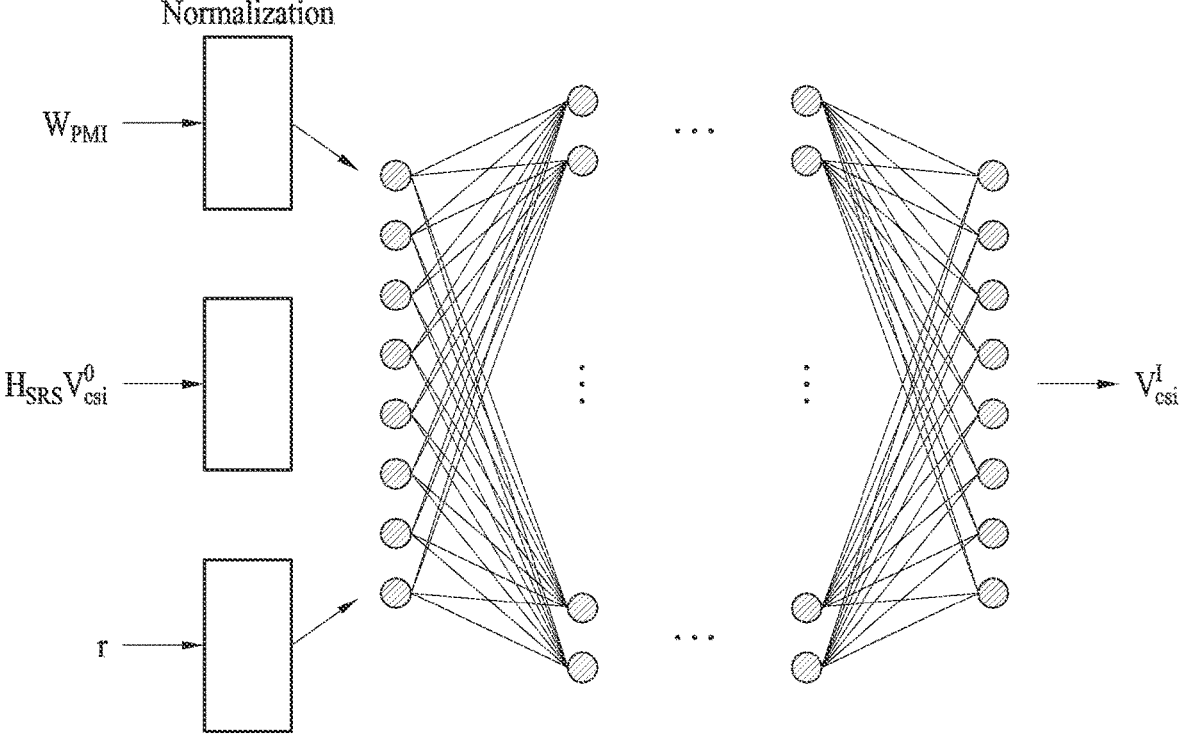
FIG. 6 illustrates a pre-trained port virtualization matrix generation model according to an embodiment of the disclosure.

FIG. 6 illustrates a pre-trained port virtualization matrix generation model according to an embodiment of the disclosure.

Referring to FIG. 6, a port virtualization matrix generation model for receiving a target precoding matrix $W_{PMI}$, a product matrix $$H_{SRS} V_{csi}^0$$

of partial channel information $H_{SRS}$ and an initial port virtualization matrix $$V_{csi}^0,$$

and a rank r as input and outputting a target port virtualization matrix $$V_{csi}^1$$

as a result for the input may be pre-trained. For example, the port virtualization matrix generation model is a deep neural network (DNN)-based model.

For example, the port virtualization matrix generation model generates the target port virtualization matrix $$V_{csi}^1$$

by determining the elements of a matrix of a size the same as the size of the initial port virtualization matrix $$V_{csi}^0.$$

For example, the elements of the matrix are "0" or "1". As another example, the elements of the matrix may be a combination of exponential functions.

As another example, the port virtualization matrix generation model may determine (or select) one of the plurality of candidate port virtualization matrices in the pre-generated port virtualization codebook to be the target port virtualization matrix $$V_{csi}^1.$$

The method of generating the port virtualization codebook is described in detail below with reference to FIG. 7.

<Test Results>

According to an example, one hundred arbitrary candidate port virtualization matrices may be generated, and L candidate port virtualization matrices showing the highest data transmission rates measured in various channel situations may be selected therefrom.

Table 1 below shows the values of variables used in the test. Table 2, Table 3, and Table 4 show the accuracies of selecting a target port virtualization matrix using the port virtualization matrix generation model and the transmission rates when the selected target port virtualization matrix is used.

TABLE 1

| TX/RX antennas | $N_{rx} = 4$, $N_{tx} = 32$ | Solver | adam |
|---|---|---|---|
| CSI-RS ports | $N_{csi} = 8$ | Max epoch | $10^5$ |
| Number of SRS antennas | $N_{SRS} = 1$ | Training set | 95000 |
| Channel | Rayleigh | Validation set | 5000 |
| Receiver | MMSE | Number of inputs | 1(RI) + 2 × (32(precoder) + 8(SRS channel)) = 81 |
| SNR | 20 dB | Activation function | Hidden: ReLU, Output: Softmax |

TABLE 2

| L = 15 | 1 Input × 16 | 1 Input × 32 | 1 Input × 64 | 1 Input × 128 | 2 Input × 4 | 2 Input × 8 | # of Layer # of Node |
|---|---|---|---|---|---|---|---|
| 5000 | 20 | 21.4 | 22.5 | 23.4 | 65.6 | 100 | |
| 10000 | 17 | 18 | 18.7 | 19.5 | 54.5 | 100 | |
| Batch size | | | | | | | |

TABLE 3

| L = 30 | 2 Input × 8 |
|---|---|
| 5000 | 100 |
| 10000 | 100 |

TABLE 4

| L | DNN | Exhaustive Search (L = 100) | Conventional |
|---|---|---|---|
| 15 | 25.26 (8.4%) | 26.20 (12.4%) | 23.30 |
| 30 | 25.66 (10.19%) | | |

When codebooks including fifteen and thirty port virtualization matrices are used, a DNN model having two hidden layers and nodes corresponding to eight times the input value achieved 100% accuracy in selecting a port virtualization matrix. Transmitting data using the trained DNN model achieved performance improvements of 8.4% and 10.1%, respectively, in terms of data transmission rate, compared to the existing method that continuously uses the initial port virtualization matrix $$V_{csi}^0$$

without updating the port virtualization matrix. Performing an exhaustive search using all the hundred candidate port virtualization matrices without selecting L candidate port virtualization matrices achieved a performance improvement of 12.4% compared to the existing method.

Figure 7:
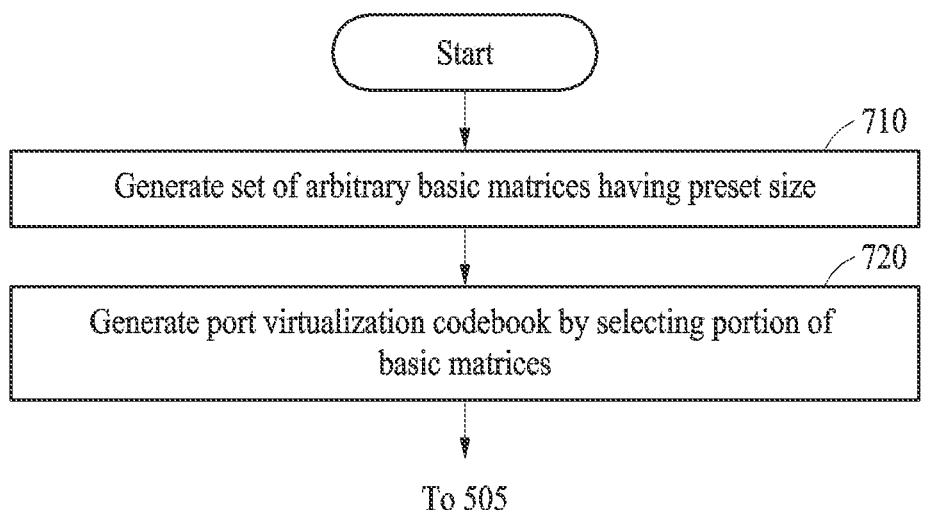
FIG. 7 is a flowchart of a method of generating a port virtualization codebook according to an embodiment of the disclosure.

FIG. 7 is a flowchart of a method of generating a port virtualization codebook according to an embodiment of the disclosure.

Referring to FIG. 7, operations 710 and 720 to be described below may be further performed before operation 505 described above with reference to FIG. 5 is performed. Operations 710 and 720 may be performed by the base station 300 or another electronic device.

In operation 710, the base station 300 may generate a set of arbitrary basic matrices having a preset size. The preset size may correspond to the number of a plurality of antennas and the number of CSI-RS ports of the base station 300. For example, the row size of a basic matrix may be the number of antennas, and the column size thereof may be the number of CSI-RS ports. The set of basic matrices is described in detail below with reference to FIGS. 8A and 8B.

In operation 720, the base station 300 may generate a port virtualization codebook by selecting a portion of the basic matrices. For example, the base station 300 may generate the port virtualization codebook by selecting a portion (e.g., a preset number L), of the basic matrices, showing the highest transmission performances (e.g., data transmission rates). The port virtualization matrices in the port virtualization codebook may be candidate port virtualization matrices.

FIGS. 8A and 8B illustrate a set of arbitrary basic matrices according to various embodiments of the disclosure.

Referring to FIGS. 8A and 8B, the row size of a basic matrix may be the number of antennas, and the column size thereof may be the number of CSI-RS ports.

For example, the set of basic matrices shown in FIG. 8A includes basic matrices in which only one of the elements in each row is "1" and the other elements are "0".

As another example, the set of basic matrices shown in FIG. 8B includes basic matrices in which all elements in a matrix have "0" or "1".

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PIU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage media or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording media.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as compact disc read only memory (CD-ROM) discs, digital versatile discs (DVDs), and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A base station comprising:

a transceiver configured to exchange data with an external device;

memory storing one or more computer programs; and one or more processors communicatively coupled to the transceiver and the memory, wherein the one or more computer programs include computer-executable instructions that, when executed by the one or more processors, cause the base station to:

generate a channel state information-reference signal (CSI-RS) to be transmitted to a user terminal through a plurality of antennas of the transceiver, transmit a test signal generated by applying an initial port virtualization matrix to the CSI-RS to the user terminal through the transceiver, wherein the test signal is propagated to the user terminal through channels between the plurality of antennas of the transceiver and one or more antennas of the user terminal, receive, from the user terminal through the transceiver, rank information for the channels to which the initial port virtualization matrix is applied and information about a target precoding matrix for the channels, obtain partial channel information based on a sounding reference signal (SRS) received from the user terminal through the transceiver, and generate a target port virtualization matrix based on the rank information, the target precoding matrix, and the partial channel information, wherein the target port virtualization matrix is used by the base station to transmit data to the user terminal, and wherein the information about the target precoding matrix for the channels is calculated based on the following equation:

$$PMI = \underset{i=1,\ldots,M}{\mathrm{argmax}} \sum_{j=1,\ldots,r} \log\left(1 + \frac{\left|R_j^H HV_{csi}W_{i,j}\right|^2}{\sum_{k\neq j}\left|R_j^H HV_{csi}W_{i,k}\right| + \sigma^2}\right),$$

in the equation, a precoding matrix indicator (PMI) is the information about the target precoding matrix, M is a number of a plurality of precoding matrices in a precoding codebook, the matrix W is one of the plurality of precoding matrices, a matrix $HV_{csi}$ denotes a port virtualization matrix $V_{csi}$ to which a matrix H representing the channels is applied, the matrix R denotes a receiver matrix of the user terminal, r is a rank of the matrix H, and σ is a preset value.

2. The base station of claim 1, wherein the initial port virtualization matrix and the target port virtualization matrix are matrices to map the plurality of antennas and one or more ports that are fewer than the plurality of antennas.

3. The base station of claim 1, wherein the one or more computer programs further include computer-executable instructions that, when executed by the one or more processors, cause the base station to:

determine the target port virtualization matrix among a plurality of candidate port virtualization matrices in a pre-generated port virtualization codebook based on the rank information, the target precoding matrix, and the partial channel information.

4. The base station of claim 3, wherein the one or more computer programs further include computer-executable instructions that, when executed by the one or more processors, cause the base station to:

input the rank information, the target precoding matrix, and the partial channel information to a pre-trained port virtualization matrix generation model, and obtain the target port virtualization matrix among the plurality of candidate port virtualization matrices in the port virtualization codebook as a result of the inputting.

5. The base station of claim 3, wherein the one or more computer programs further include computer-executable instructions that, when executed by the one or more processors, cause the base station to:

generate a set of arbitrary basic matrices having a preset size; and generate the port virtualization codebook by selecting a portion of the set of arbitrary basic matrices.

6. The base station of claim 1, wherein the one or more computer programs further include computer-executable instructions that, when executed by the one or more processors, cause the base station to:

generate the target port virtualization matrix by inputting the rank information, the target precoding matrix, and the partial channel information to a pre-trained port virtualization matrix generation model.

7. The base station of claim 1, wherein elements of the target port virtualization matrix are "0" or "1".

8. The base station of claim 1, wherein elements of the target port virtualization matrix are a combination of exponential functions.

9. A signal transmission method for wireless communication, performed by a base station, the signal transmission method comprising:

generating, by the base station, a channel state information-reference signal (CSI-RS) to be transmitted to a user terminal through a plurality of antennas of a transceiver of a base station;

transmitting, by the base station, a test signal generated by applying an initial port virtualization matrix to the CSI-RS to the user terminal, wherein the test signal is propagated to the user terminal through channels between the plurality of antennas of the transceiver and one or more antennas of the user terminal;

receiving, by the base station from the user terminal, rank information for the channels to which the initial port virtualization matrix is applied and information about a target precoding matrix for the channels;

obtaining, by the base station, partial channel information based on a sounding reference signal (SRS) received from the user terminal;

generating, by the base station, a target port virtualization matrix based on the rank information, the target precoding matrix, and the partial channel information; and transmitting, by the base station, a data signal to the user terminal using the target port virtualization matrix, wherein the information about the target precoding matrix for the channels is calculated based on the following equation:

$$PMI = \underset{i=1,\ldots,M}{\mathrm{argmax}} \sum_{j=1,\ldots,r} \log\left(1 + \frac{\left|R_j^H HV_{csi}W_{i,j}\right|^2}{\sum_{k\neq j}\left|R_j^H HV_{csi}W_{i,k}\right| + \sigma^2}\right),$$

in the equation, a precoding matrix indicator (PMI) is the information about the target precoding matrix, M is a number of a plurality of precoding matrices in a precoding codebook, a matrix W is one of the plurality of precoding matrices, a matrix $HV_{csi}$ denotes a port virtualization matrix $V_{csi}$ to which a matrix H representing the channels is applied, the matrix R denotes a receiver matrix of the user terminal, r is a rank of the matrix H, and o is a preset value.

10. The signal transmission method of claim 9, wherein the initial port virtualization matrix and the target port virtualization matrix are matrices to map the plurality of antennas and one or more ports that are fewer than the plurality of antennas.

11. The signal transmission method of claim 9, wherein the generating of the target port virtualization matrix comprises:

determining the target port virtualization matrix among a plurality of candidate port virtualization matrices in a pre-generated port virtualization codebook based on the rank information, the target precoding matrix, and the partial channel information.

12. The signal transmission method of claim 9, wherein the generating of the target port virtualization matrix comprises:

generating the target port virtualization matrix by inputting the rank information, the target precoding matrix, and the partial channel information to a pre-trained port virtualization matrix generation model.

13. The signal transmission method of claim 9, wherein elements of the target port virtualization matrix are "0" or "1".

14. The signal transmission method of claim 9, wherein elements of the target port virtualization matrix are a combination of exponential functions.

15. One or more non-transitory computer-readable storage media storing one or more computer programs including computer-executable instructions that, when executed by one or more processors of a base station, cause the base station to perform operations, the operations comprising:

generating, by the base station, a channel state information-reference signal (CSI-RS) to be transmitted to a user terminal through a plurality of antennas of a transceiver of a base station;

transmitting, by the base station, a test signal generated by applying an initial port virtualization matrix to the CSI-RS to the user terminal, wherein the test signal is propagated to the user terminal through channels between the plurality of antennas of the transceiver and one or more antennas of the user terminal;

receiving, by the base station from the user terminal, rank information for the channels to which the initial port virtualization matrix is applied and information about a target precoding matrix for the channels;

obtaining, by the base station, partial channel information based on a sounding reference signal (SRS) received from the user terminal;

generating, by the base station, a target port virtualization matrix based on the rank information, the target precoding matrix, and the partial channel information; and transmitting, by the base station, a data signal to the user terminal using the target port virtualization matrix, wherein the information about the target precoding matrix for the channels is calculated based on the following equation:

$$PMI = \underset{i=1,\ldots,M}{\operatorname{argmax}} \sum_{j=1,\ldots,r} \log\left(1 + \frac{\left|R_j^H HV_{csi}W_{i,j}\right|^2}{\sum_{k \neq j}\left|R_j^H HV_{csi}W_{i,k}\right| + \sigma^2}\right),$$

in the equation, a precoding matrix indicator (PMI) is the information about the target precoding matrix, M is a number of a plurality of precoding matrices in a precoding codebook, a matrix W is one of the plurality of precoding matrices, a matrix $HV_{csi}$ denotes a port virtualization matrix $V_{csi}$ to which a matrix H representing the channels is applied, the matrix R denotes a receiver matrix of the user terminal, r is a rank of the matrix H, and $\sigma$ is a preset value.

16. The one or more non-transitory computer-readable storage media of claim 15, wherein the initial port virtualization matrix and the target port virtualization matrix are matrices to map the plurality of antennas and one or more ports that are fewer than the plurality of antennas.

\* \* \* \* \*